(12) United States Patent
Berglund et al.

(10) Patent No.: US 6,475,117 B1
(45) Date of Patent: Nov. 5, 2002

(54) CONNECTION/STRUCTURE

(75) Inventors: David A. Berglund, Golden Valley; Steve King, Maple Plain, both of MN (US)

(73) Assignee: Landscape Structures, Inc., Delano, MN (US)

( * ) Notice: Subject to any disclaimer, the term of this patent is extended or adjusted under 35 U.S.C. 154(b) by 0 days.

(21) Appl. No.: 09/357,354

(22) Filed: Jul. 14, 1999

Related U.S. Application Data
(60) Provisional application No. 60/092,892, filed on Jul. 15, 1998.

(51) Int. Cl.⁷ .............................................. A63B 17/00
(52) U.S. Cl. ......................... 482/35; 403/171; 403/176
(58) Field of Search ..................... 482/35, 36; 403/171, 403/217, 379, 172, 176; 52/646, 647, 648.1, 652.1, 656.9; 135/147; 248/219.1; 182/138, 196, 198

(56) References Cited

U.S. PATENT DOCUMENTS

| | | | | |
|---|---|---|---|---|
| 285,605 A | * | 9/1883 | Flora | |
| 1,488,244 A | * | 3/1924 | Hinton | 482/35 |
| 2,126,636 A | * | 8/1938 | Horne | 482/35 |
| 3,286,391 A | * | 11/1966 | Mengeringhausen | 046/29 |
| 3,884,327 A | * | 5/1975 | Zigman | 182/113 |
| 4,084,812 A | * | 4/1978 | Melrose et al. | 482/35 |
| 4,161,088 A | * | 7/1979 | Gugliotta et al. | 052/233 |
| 4,252,313 A | * | 2/1981 | Skalka | 482/35 |
| 4,480,418 A | * | 11/1984 | Ventrella | 052/648 |
| 4,864,795 A | * | 9/1989 | Burg | 403/175 |
| 5,069,572 A | * | 12/1991 | Niksic | 403/170 |
| 5,074,094 A | * | 12/1991 | Glasser | 052/648 |
| 5,074,700 A | * | 12/1991 | Swoboda | 403/171 |
| 5,111,631 A | * | 5/1992 | Flood et al. | 52/646 |
| 5,626,434 A | * | 5/1997 | Cook | 403/176 |
| 5,667,326 A | * | 9/1997 | McGaffigan | 403/176 |
| 5,755,641 A | * | 5/1998 | Pardella | 482/36 |

* cited by examiner

Primary Examiner—Justine R. Yu
(74) Attorney, Agent, or Firm—Christopher L. Holt; Westman, Champlin & Kelly, P.A.

(57) ABSTRACT

A climbing structure includes a first strut having an elongate portion, a first end portion and a transition portion between the elongate portion and the first end portion. The transition portion has a reduced thickness relative to the first end portion. A connection member has first and second connectable plates defining a first cavity. The first cavity is sized to receive and secure the first end portion therein.

18 Claims, 14 Drawing Sheets

FIG. 14B ered netting portions 18, 20, 22
CONNECTION/STRUCTURE

REFERENCE TO RELATED APPLICATION

The present application claims priority from U.S. provisional application Ser. No. 60/092,892 filed on Jul. 15, 1998.

BACKGROUND OF THE INVENTION

The present invention relates to climbing structures. More specifically, the present invention relates to a modular type structure for children's entertainment apparatus.

Children's climbing and entertainment apparatus have been widely used. The concept of a continuous play apparatus was introduced some time ago. In accordance with that concept, a plurality of different apparatus are joined together to form one larger, continuous-type structure. This is in contrast to prior children's entertainment areas which included a plurality of discrete, separately located apparatus.

Children's entertainment systems can, at times, be constrained by space or other criteria which require the placement of the entertainment apparatus in a certain physical configuration. Similarly, the systems designers for children's play apparatus may wish to provide climbing or hanging structures (together referred to herein as "climbing structures") with different physical configurations for the purpose of stimulating the children's imagination and for enhancing the play experience when using the structure. In order to do this, some systems designers design climbing and play structures in a wide variety of different physical configurations. In the past, this has required different connection mechanisms to accommodate the widely varying physical configurations. However, providing different connection mechanisms for each different type of play structure can be highly inefficient in both the manufacturing and assembly procedures.

SUMMARY OF THE INVENTION

A climbing structure includes a first strut having an elongate portion, a first end portion and a transition portion between the elongate portion and the first end portion. The transition portion has a reduced thickness relative to the first end portion. A connection member has first and second connectable plates defining a first cavity. The first cavity is sized to receive and secure the first end portion therein.

BRIEF DESCRIPTION OF THE DRAWINGS

FIG. 7–FIGS. 8A–8C illustrate the formation of a strut in accordance with one embodiment of the present invention.

DETAILED DESCRIPTION OF THE ILLUSTRATIVE EMBODIMENTS

The present invention provides a modular-type structure including struts and connecting members, which can be configured in a wide variety of ways. Modules can be formed and connected in such a way as to provide an overall structure suitable for climbing and other structures used, in one illustrative embodiment, for children's entertainment apparatus.

Figures 1A, 1B:
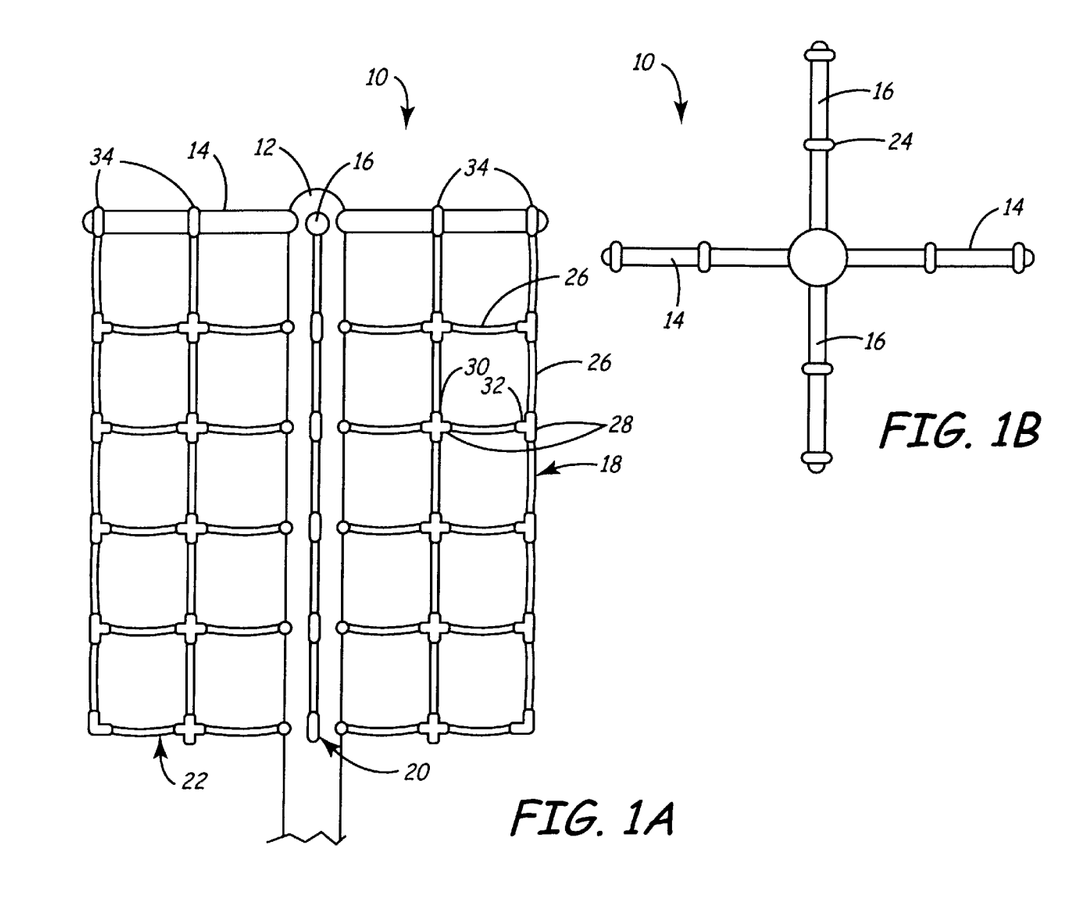
FIGS. 1A and 1B illustrate an exemplary structure formed in accordance with one aspect of the present invention.

FIGS. 1A and 1B illustrate an exemplary structure 10 formed in accordance with one aspect of the present invention. Structure 10 includes support pole 12, cross-members 14 and 16, and modularly formed netting portions 18, 20, 22 and 24. Pole 12 and cross-members 14 and 16 can be formed of any suitable material, such as. stainless steel tubing or other suitable material, and can be connected together using suitable, and commercially known, connection mechanisms, such as welding. Netting portions 18–24, in one preferred embodiment, are formed of elongate struts 26 which are connected to one another at joints 28.

In an illustrative embodiment, struts 26 are all formed similarly. Joints 28 are formed of three-way or four-way connecting members 30 and 32, or other suitable connecting members, as will be discussed greater detail later in the application.

Netting portions 18, 20, 22 and 24, are illustratively connected to cross-members 14 and 16 by coupling components 34. Coupling components 34, in one preferred embodiment, are simply mechanical clamps which have two mating portions, releasably mated to one another about cross-members 14 and 16. In another preferred embodiment, components 34 are simply weldable elements coupled to the upwardly extending struts (or rungs) 26, which are adjacent cross-members 14 and 16, and which are welded directly to cross-members 14 and 16. Such an embodiment is described in greater detail with respect to FIGS. 5 and 6.

Figure 2A:
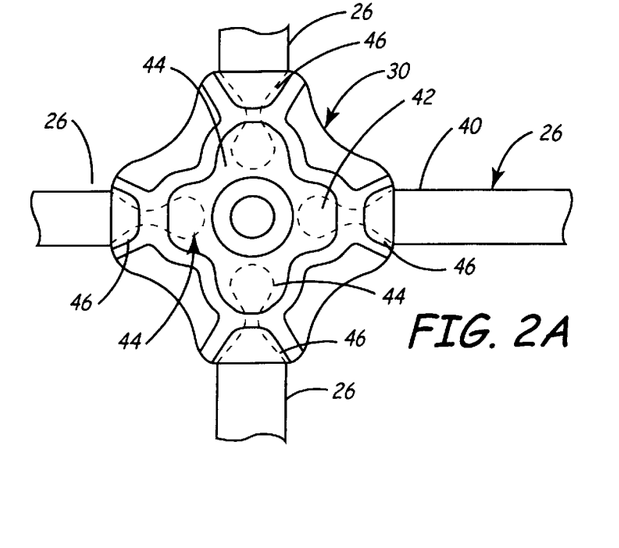
FIGS. 2A–2D illustrate a four-way connection member in accordance with one embodiment of the present invention.

FIGS. 2A–2D illustrate a four-way connection member 30 (also shown in FIG. 1A) in greater detail. FIG. 2A illustrates that connection member 30 connects four struts 26 together. Struts 26 are described in greater detail later in the application. Briefly, however, struts 26 each include an outer shaft portion 40 and end portions 42. End portions 42 typically include ball shanks which are sagged to a cable which runs through outer shaft portion 40. Connection member 30, in one illustrative embodiment, defines four interior chambers or cavities 44 therein which retain balls 42. Connection member 30 also illustratively includes four outer chambers or cavities 46 therein which receive the end portions of outer shaft 40.

Figure 2B:
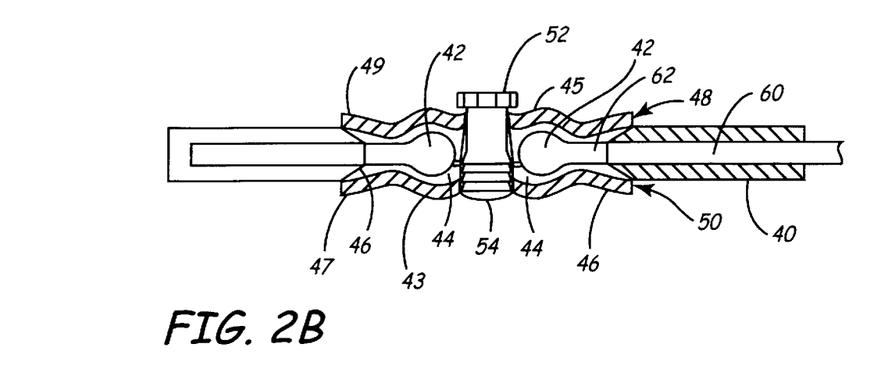

FIG. 2B is a side sectional view of a portion of connection member 30. FIG. 2B illustrates that, in one illustrative embodiment, connection member 30 is formed of first and second hubs or connection plates 48 and 50 which are generally disposed in opposing relation to one another and which are connected to one another by bolt 52. Connection plates 48 and 50 are formed such that, when they are placed in opposing relation as illustrated in FIG. 2B, radial inner and radial outer cavities 44 and 46 are formed between opposing spaced portions 43, 45 and 47, 49.

Connection plate 50, in the illustrative embodiment, includes a threaded inner bore 54. Bolt 52 has a threaded outer surface which threadably engages bore 54. Thus, during assembly, balls 42 are placed within the recess defined by portion 43 in plate 50 which forms half of the inner cavity 44. Plate 48 is then assembled over the top of plate 50 such that the recess formed by portion 45 in plate 48 which forms the other half of inner cavity 44 is positioned over balls 42. Bolt 52 is then inserted within the threaded bore 54 in plate 50 and tightened down to secure balls 42 within inner cavities 44.

Struts 26 each include, for example, the stainless steel ball 42 which is coupled to an inner steel cable 60. In an illustrative embodiment, ball 42 has a shank 62 which is sagged to cable 60. However, any suitable connection mechanism can be used. Outer shaft 40 is, illustratively, an injection molded soft polyvinyl chloride (PVC) shaft which is molded over cable 60. The PVC material preferably has a shore A hardness of 70–90 durometer. Of course, coating cable 60 with a softer material is optional and can be accomplished in any desired manner.

The end of outer shaft 40 which is proximate ball 42 is illustratively disposed at an angle relative to cable 60. Thus, the inner surfaces of portions 47 and 49 which form outer cavity 46 are also illustratively disposed at an outwardly directed angle. However, outer cavity 46 and the end of outer shaft 40 illustratively form an interference fit to relieve stress on the joint between the end of shank 62 and cable 60.

Figure 2C:
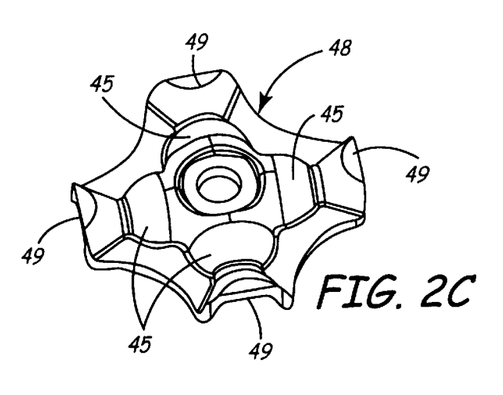
Figure 2D:
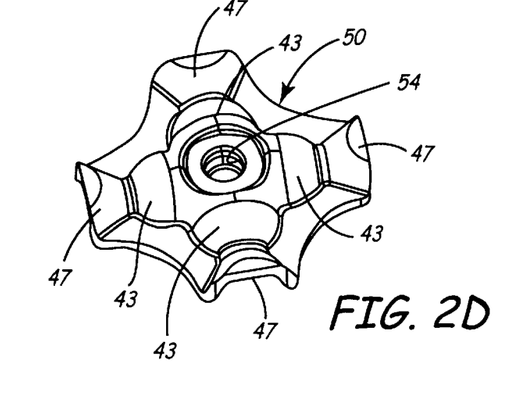

FIGS. 2C and 2D are perspective views of plates 48 and 50, respectively. While any suitable material can be used for plates 48 and 50, carbon steel is used in one illustrative embodiment. Also, in another illustrative embodiment, the carbon steel is galvanized. Similarly, cable 60 and balls 42 are also illustratively formed of galvanized carbon steel.

Figures 3A, 3C:
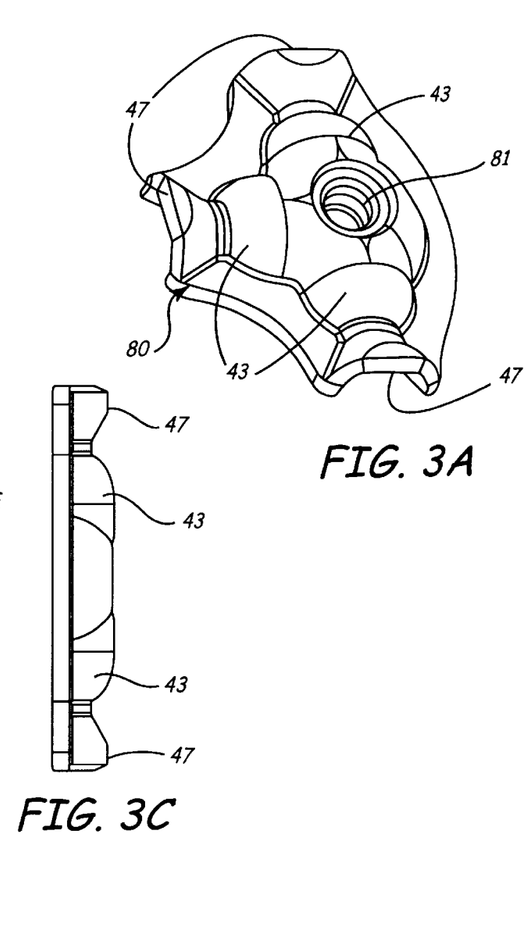
FIGS. 3A–3E and FIGS. 4A–4E illustrate a number of different views of a three-way connecting member in accordance with once embodiment of the present invention.
Figures 3B, 3D, 3E:
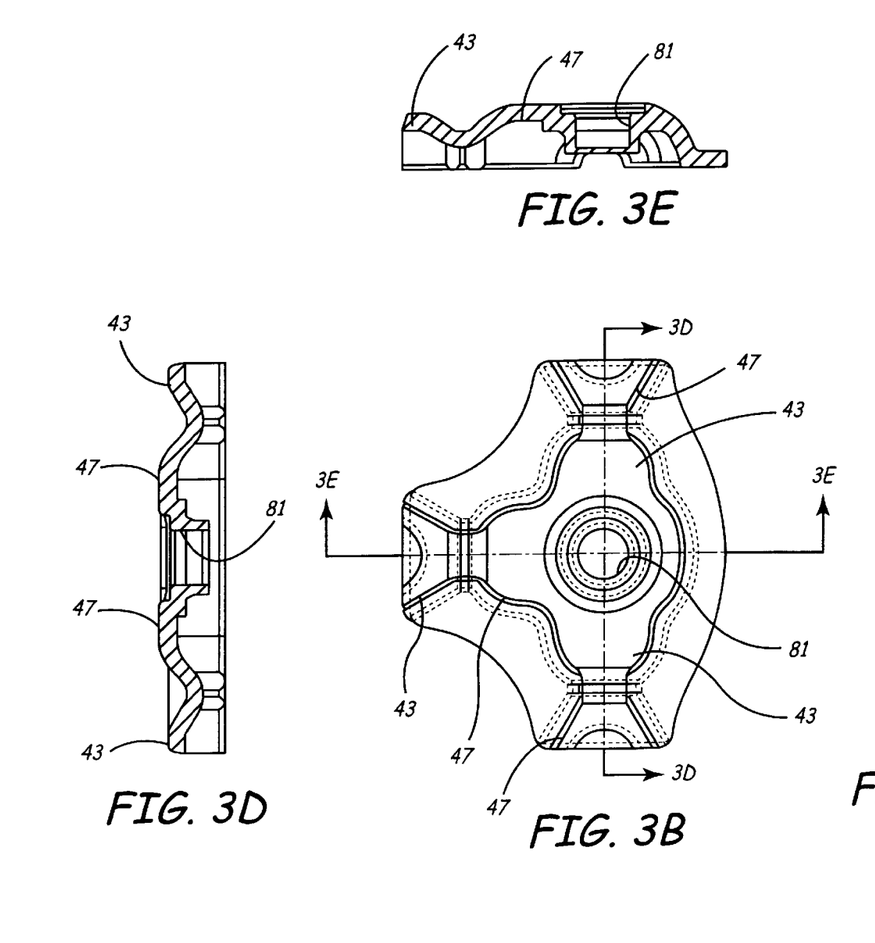
Figures 4A, 4C:
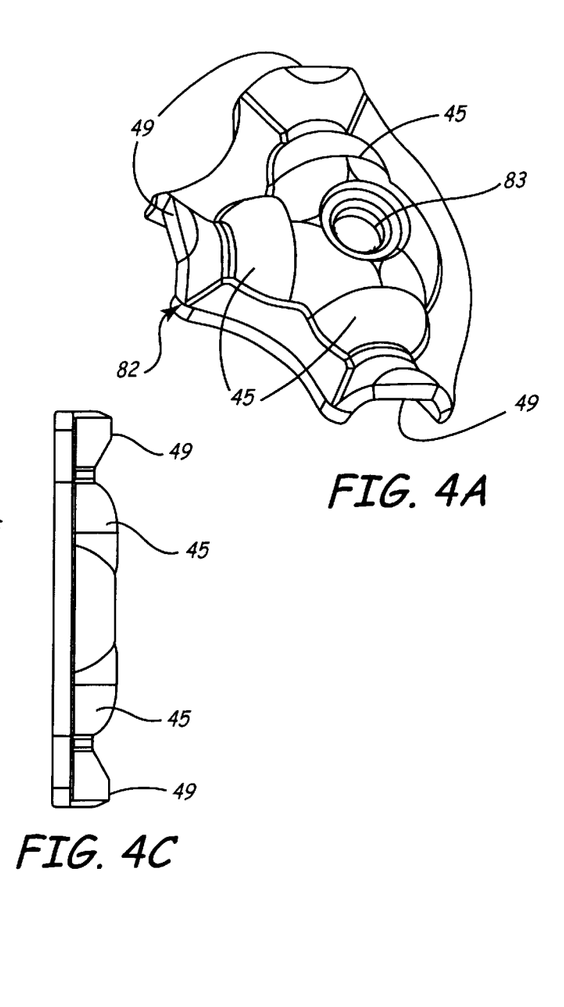
Figures 4B, 4D, 4E:
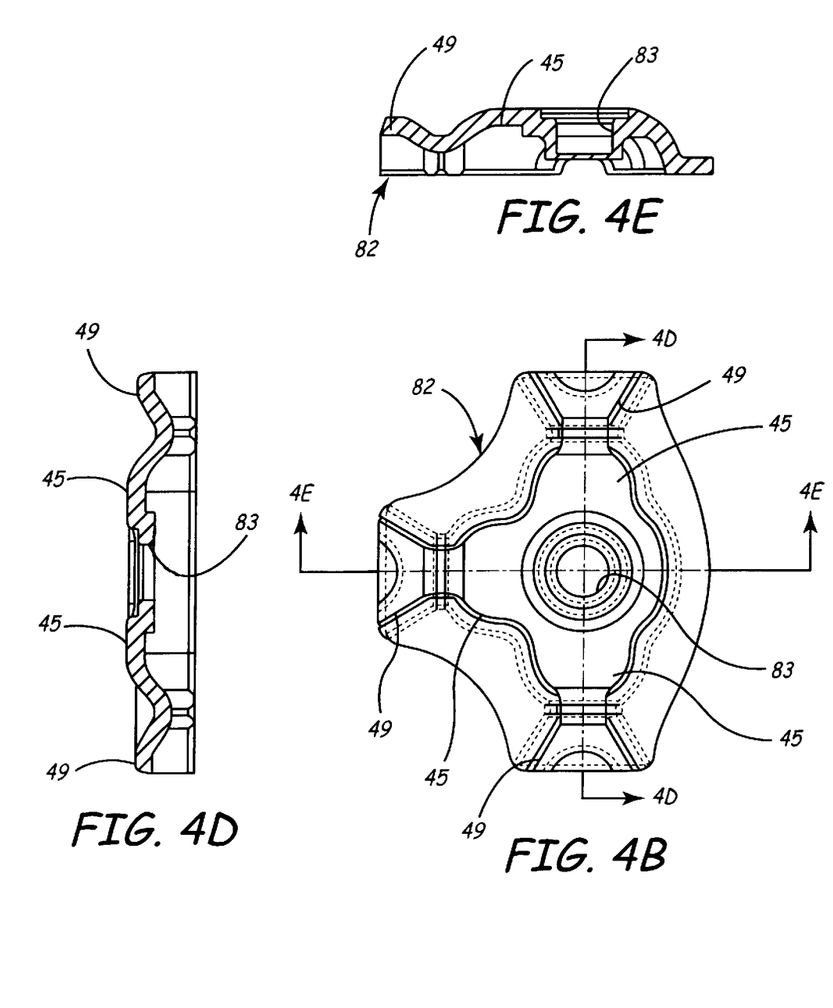

FIGS. 3A–3E and FIGS. 4A–4E illustrate a number of different views of a three-way connecting member which has generally opposed plates 80 and 82. FIGS. 3A and 4A are perspective views of plates 80 and 82 of three way connection member 32, respectively. FIGS. 3B and 4B are top views of plates 80 and 82. FIGS. 3C and. 4C are side views of plates 80 and 82, respectively. FIGS. 3D and 4D are cross-sections of plates 80 and 82 taken along section lines 3D–3D and 4D–4D, respectively, and FIGS. 3E and 4E are cross-sectional views of plates 80 and 82 taken along section lines 3E–3E and 4E–4E.

In one illustrative embodiment, plates 80 and 82 have portions 43, 45, 47 and 49 which define interior cavities 44 and exterior cavities 46, much the same as plates 48 and 50. However, only three inner cavities and three outer cavities are provided in plates 80 and 82 which form the three-way connector. Plates 80 and 82 are also provided with center holes or bores 81 and 83, at least one of which has a threaded interior surface which threadably mates with a threaded exterior surface of a bolt or screw inserted therethrough. The bolt releasably secures plates 80 and 82 together and thereby holds balls 42 in the cavities formed therebetween.

Figure 5A:
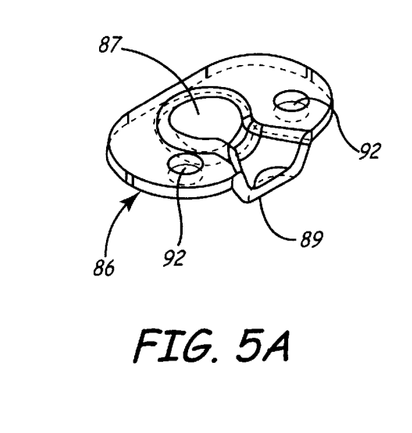
FIGS. 5A–5D and FIGS. 6A–6E illustrate a variety of views of a one-way connection member in accordance with one embodiment of the present invention.
Figure 5B:
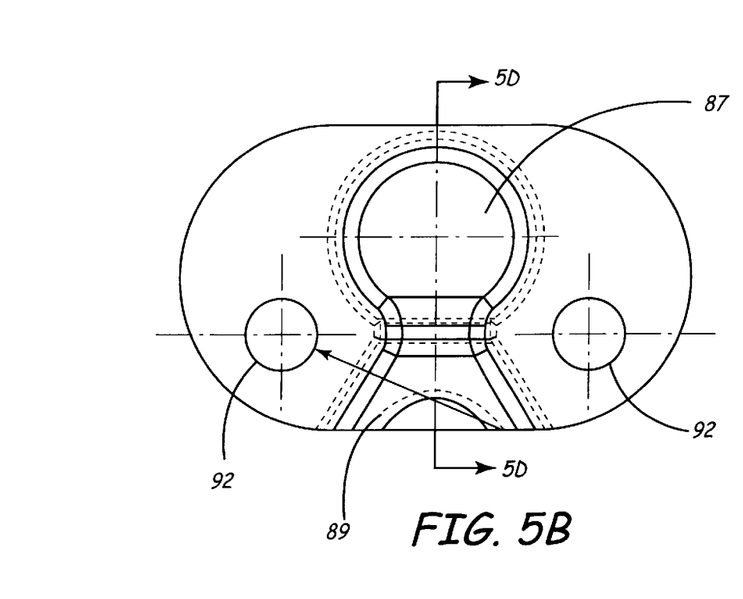
Figure 5C:
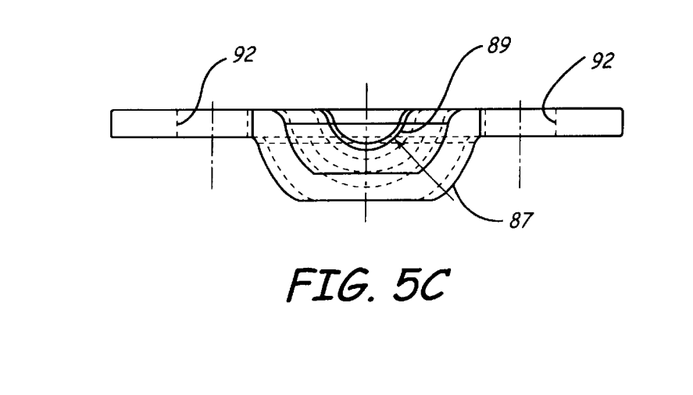
Figure 5D:
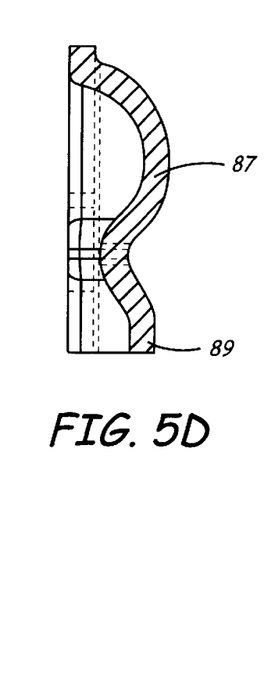
Figure 6A:
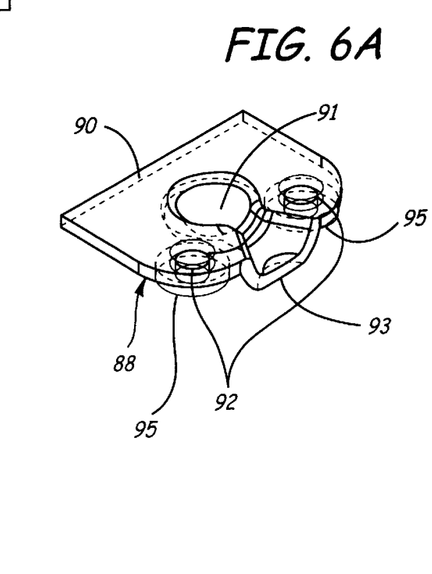
Figure 6B:
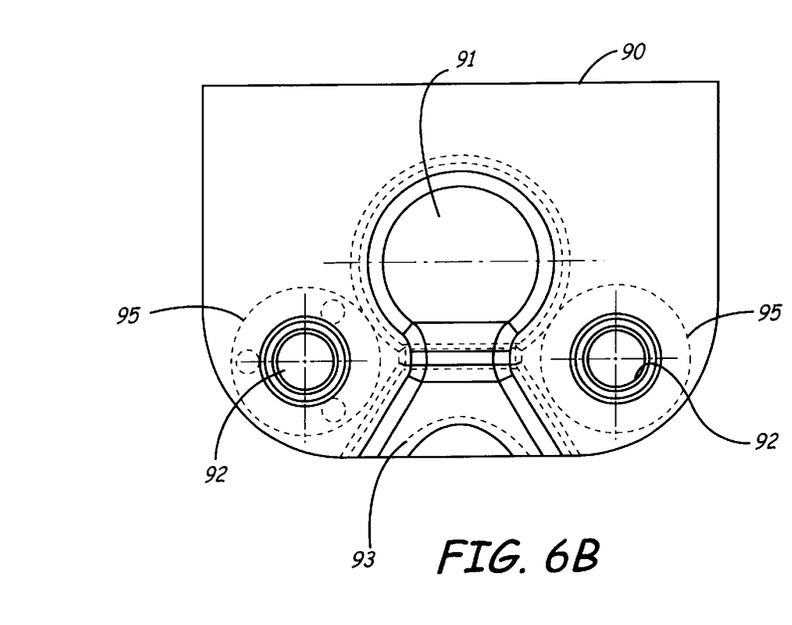
Figure 6C:
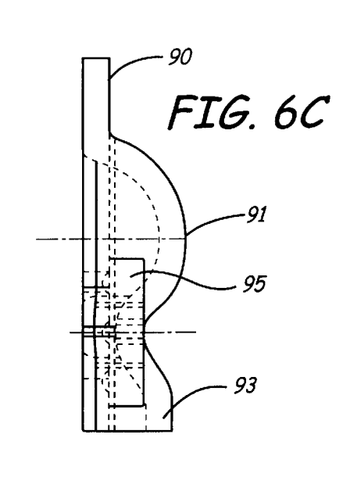
Figure 6D:
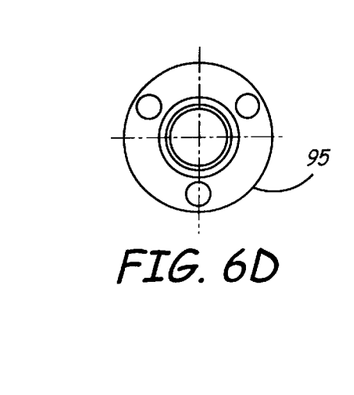
Figure 6E:
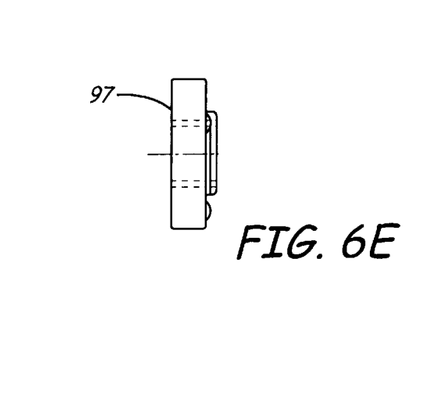

FIGS. 5A–5D and FIGS. 6A–6E illustrate a variety of views of two plates 86 and 88 which, when connected together, form a one-way connection member. FIGS. SA and 6A are perspective views of plates 86 and 88, showing a number of services in phantom. FIGS. 5B and 6B are top views of plates 86 and 88, respectively. FIG. 5C is an end view of plate 86. FIG. 6C is a side view of plate 88. FIG. 5D is a cross-sectional view of plate 86 taken along section lines 5D—5D in FIG. 5B, and FIGS. 6D and 6E illustrate a connection device (e.g., nut and bolt) used to connect plates 86 and 88 together.

Plates 86 and 88 are formed with portions 87, 89, 91 and 93 which, when assembled, define oppositely disposed inner and outer cavities 44 and 46, but form only one pair of such cavities. In addition, plate 88 is provided with a protruding edge portion 90 which protrudes in a direction generally opposite strut 26. In one illustrative embodiment, protruding edge portion 90 is formed of a weldable material which can be welded to a beam or other support surface in order to support the strut 26 which is connected to plates 86 and 88. Also, FIGS. 5A and 6C illustrate that plates 86 and 88 are each provided with a set of side holes or bores 92. Holes 92 include weld nuts 95 which are threaded in one of plates 86 and, 88. Thus, plates 86 and 88 can be held together with a set of screws or bolts 97 which threadably engage the interior threaded surface of the weld nuts 95 in holes 92.

Figure 7:
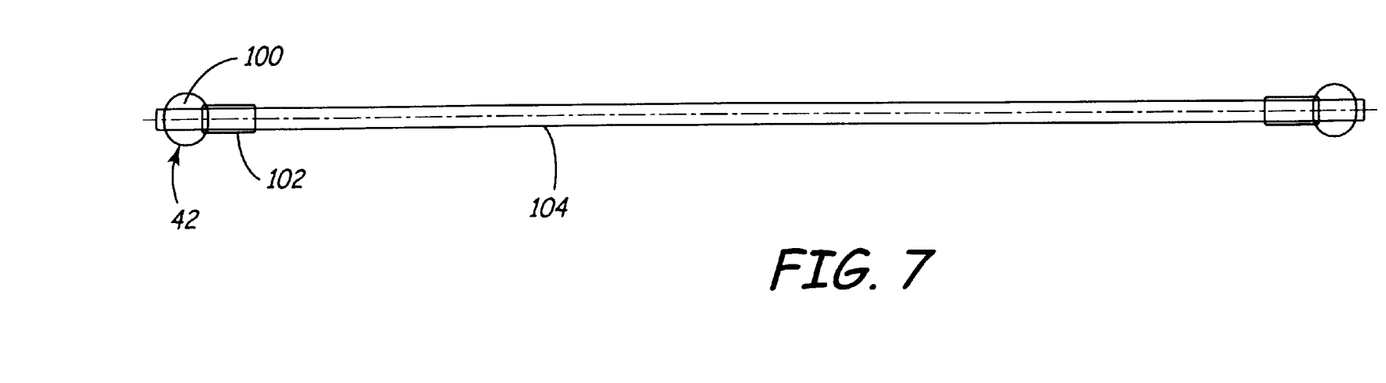
Figure 8A:
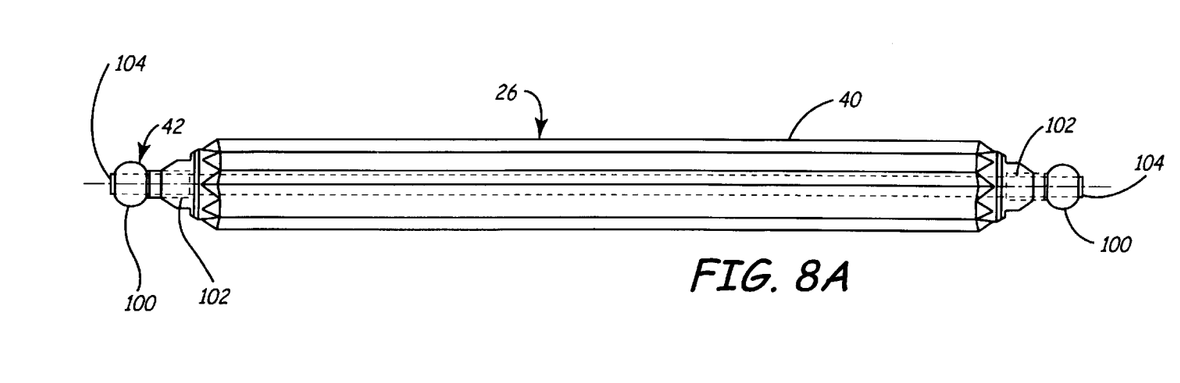
Figure 8B:
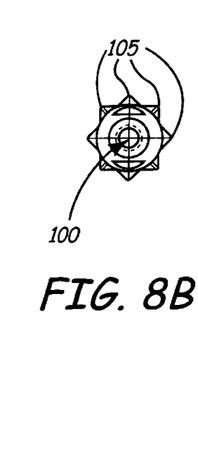
Figure 8C:
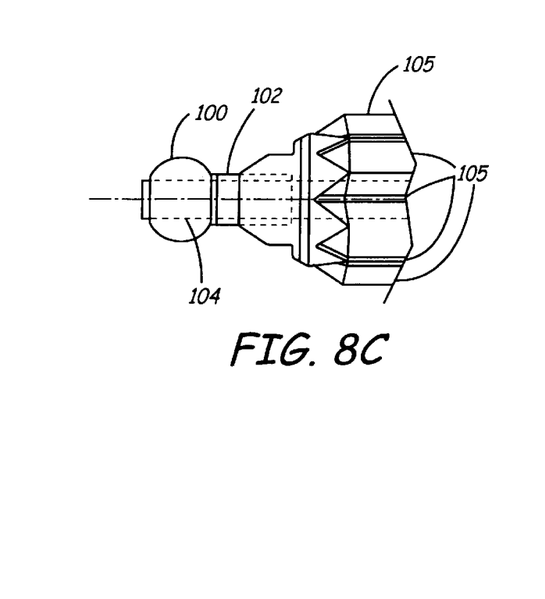

FIGS. 7–8C illustrate the formation of struts 26. FIG. 7 is a side view of a portion of strut 26. FIG. 8A is a side view of a fully assembled strut 26, with some portions shown in phantom. FIG. 8B is an end view of the strut 26 shown in FIG. 8A, and FIG. 8C is an enlarged view of one end of strut 26 shown in FIG. 8A. FIG. 7 shows that balls 42 have a ball portion 100 and a shank portion 102. Shank portion 102 is sagged or otherwise connected to flexible cable 104. As discussed above, cable 104 is illustratively a galvanized steel cable and has a 3/16 inch diameter. Of course, the material and size of cable 104 will vary, as desired, with application.

In any case, once balls 42 are connected to cable 104, outer shaft 40, as illustrated in FIG. 8, is injection molded, or otherwise assembled, over cable 104. In the embodiment illustrated, shaft 40 has an outer surface which defines ridges 105. However, a smooth surface or another friction enhancing surface can be used as well.

Thus, strut 26 forms a fairly flexible connection portion or rung which can be used to form a wide variety of structures. Also, while only three-way, four-way and one-way connective members have been illustrated, two-way connective members, or any other suitable arrangement of connection members can be used to form such structures.

Figure 9A:
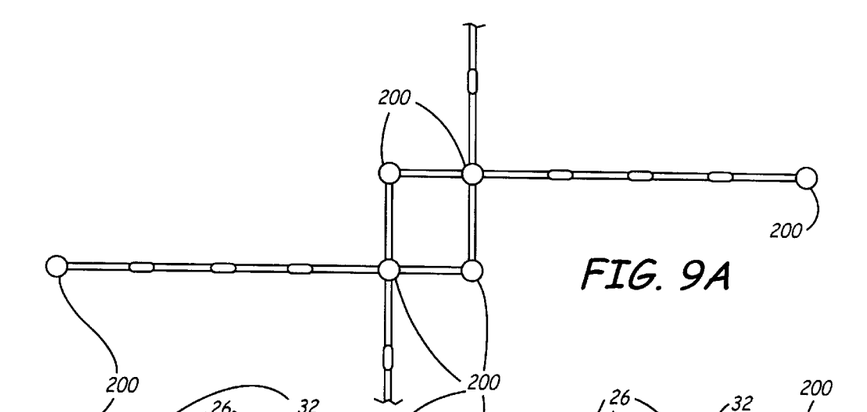
FIGS. 9A and 9B illustrate a side and top view of a structure in accordance with one embodiment of the present invention.
Figure 9B:
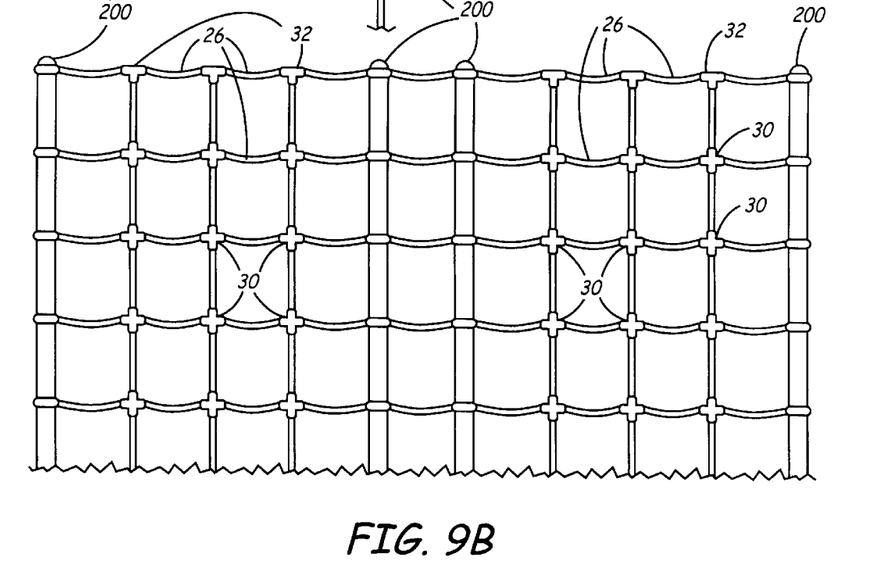

FIGS. 9A and 9B illustrates a top and side view, respectively, of one such structure. A plurality of posts 200 are provided and are used to support adjacent netting portions formed in accordance with one aspect of the present invention.

Figure 10:
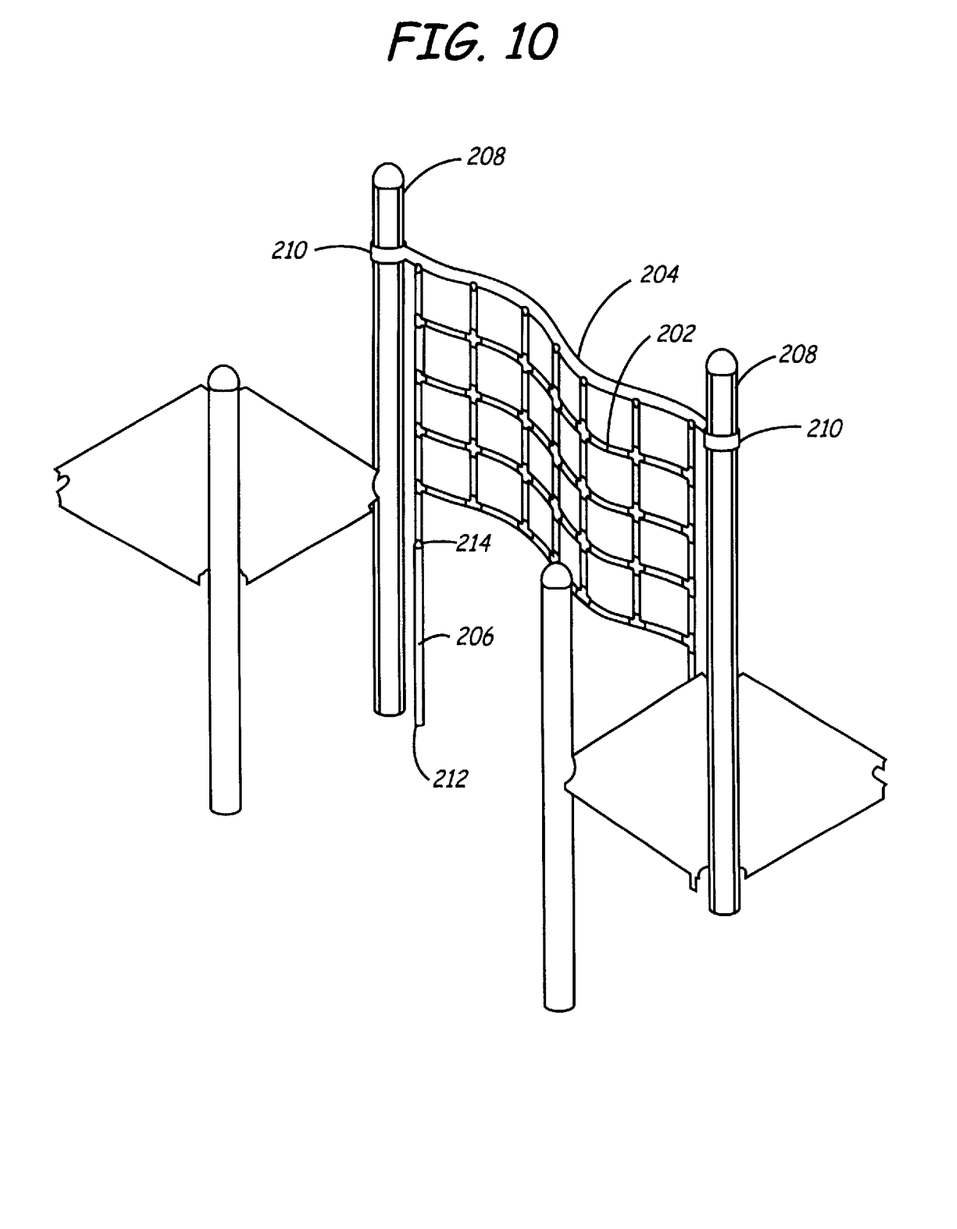
FIG. 10 illustrates yet another structure in accordance with one embodiment of the present invention.

FIG. 10 illustrates yet another structure which can be formed using the modular system in accordance with the present invention. In FIG. 10, a netting portion 202 formed of the modular connection assembly of the present invention is coupled to an upper beam 204. Netting 202 is also connected to one or more footers 206. Beam 204 is, in turn, connected to a pair of posts 208 by a suitable mechanical clamp 210, while footers 206 have a first end 212 which may be securely fastened to posts 208, embedded in concrete, or otherwise secured. Footers 206 also have an upper end 214 which is connected to netting 202. In the embodiment illustrated in FIG. 10, netting 202 is connected at its upper end to beam 204 using the one-way connectors illustrated in FIGS. 5 and 6. Protruding edge 90 on each of the upper connectors is welded to beam 204.

Figure 11:
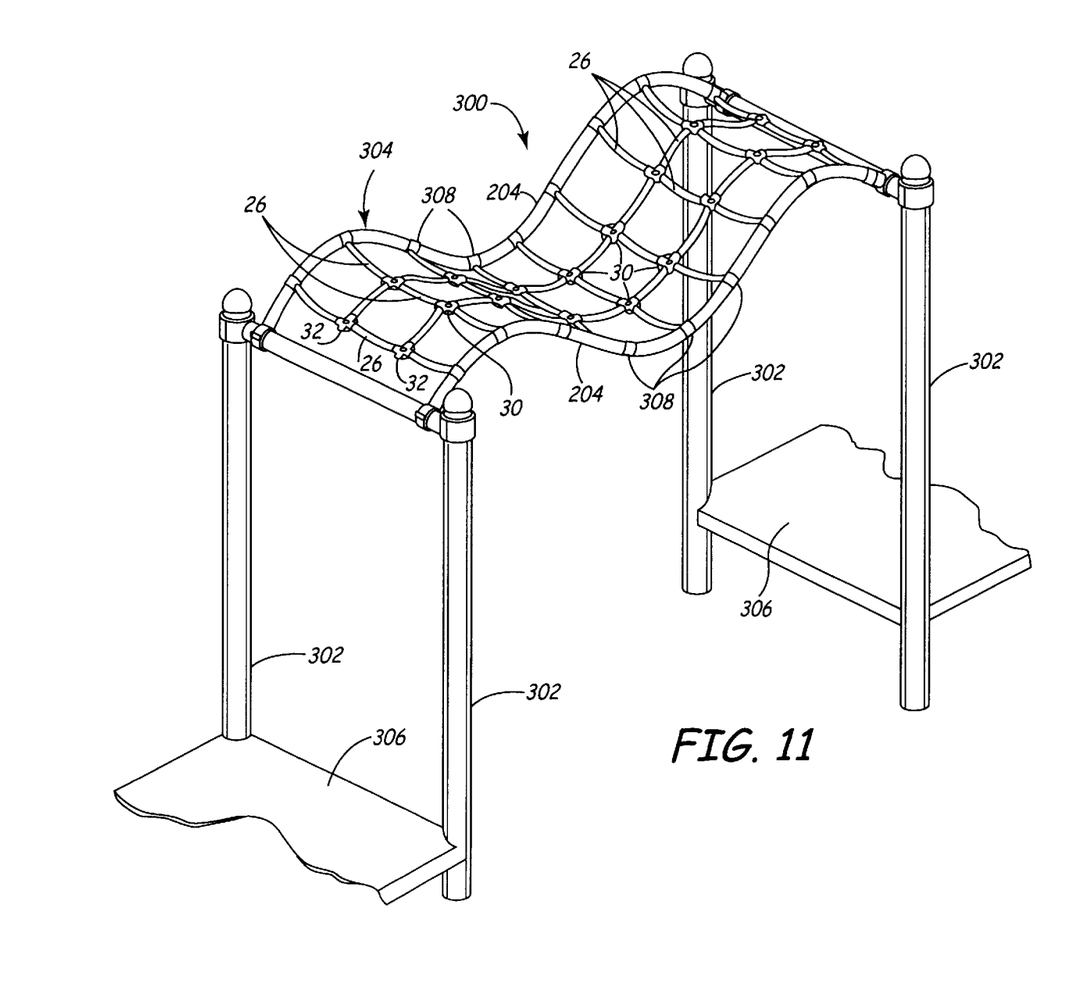
FIGS. 11 and 12 illustrate other structures in accordance with other embodiments of the present invention.
Figure 12:
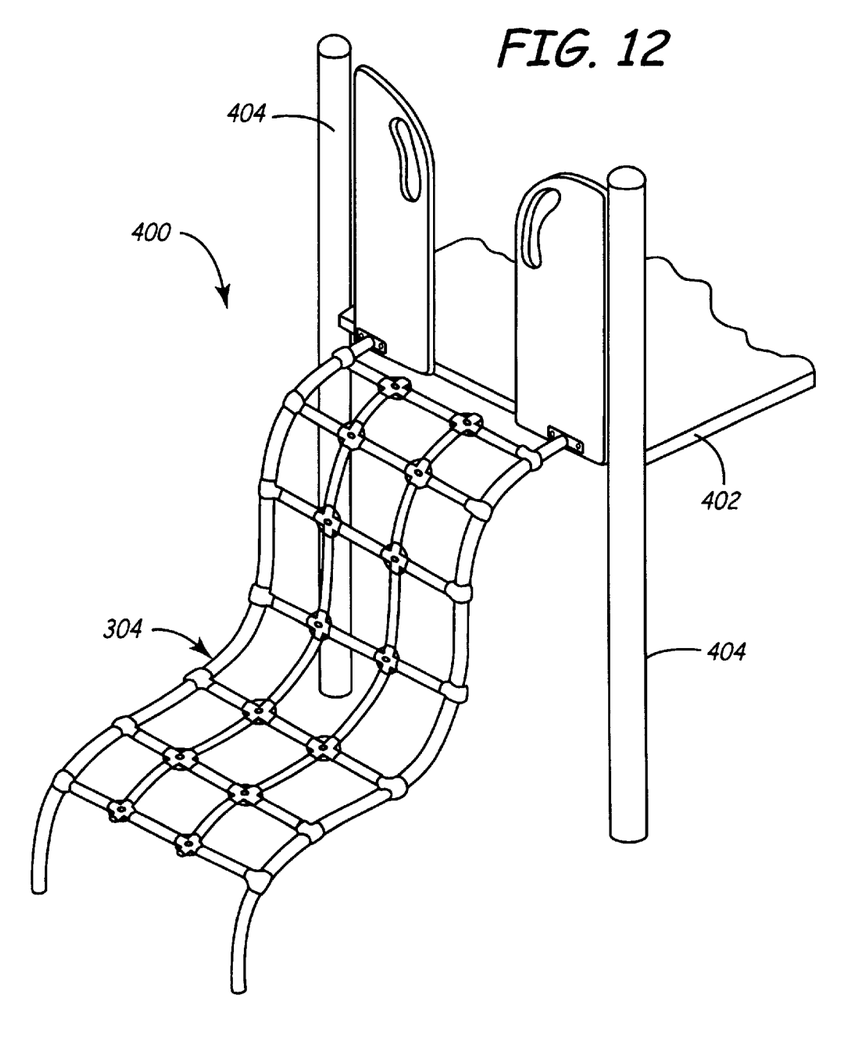

FIGS. 11 and 12 illustrate additional embodiments of structures which can be formed using the modular structural assembly of the present invention. FIG. 11 shows structure 300 which includes four corner posts 302 and a climbing assembly 304 disposed therebetween. The posts are also illustrated coupled to gangway, or walkways, 306. Climbing assembly 304 includes, in one illustrative embodiment, beams 204 on opposite ends thereof, and struts 26 and connection members 30 and clasps 308 forming the climbing structure. Clasps 308 can be members, separate from beams 204, which fold around beams 204 and clasp to the end portions of struts 26, much the same way as connection members 30 connect the ends of beams 26. However, clasps 308 can also be formed much the same way as connection member 86, illustrated in FIG. 5, with an end clasp or ring that fits around beams 204 connected thereto.

Figure 13A:
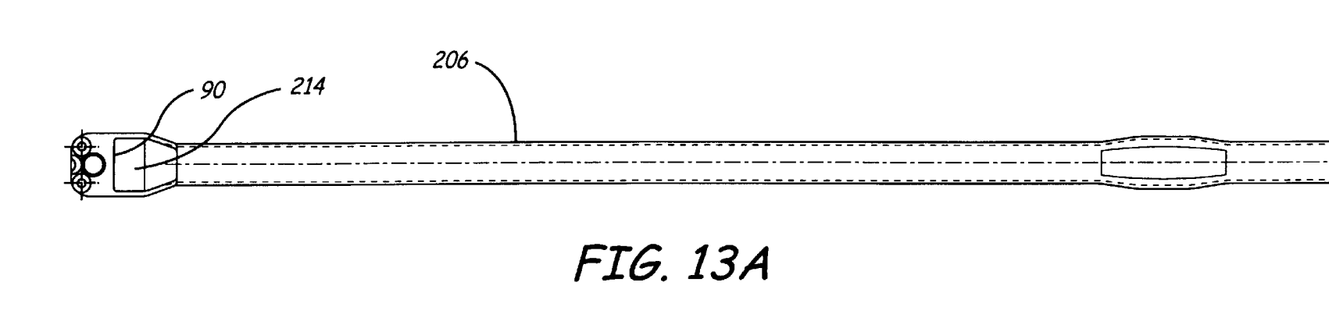
FIGS. 13A and 13B illustrate top and side views of a footer in accordance with one embodiment of the present invention.
Figure 13B:
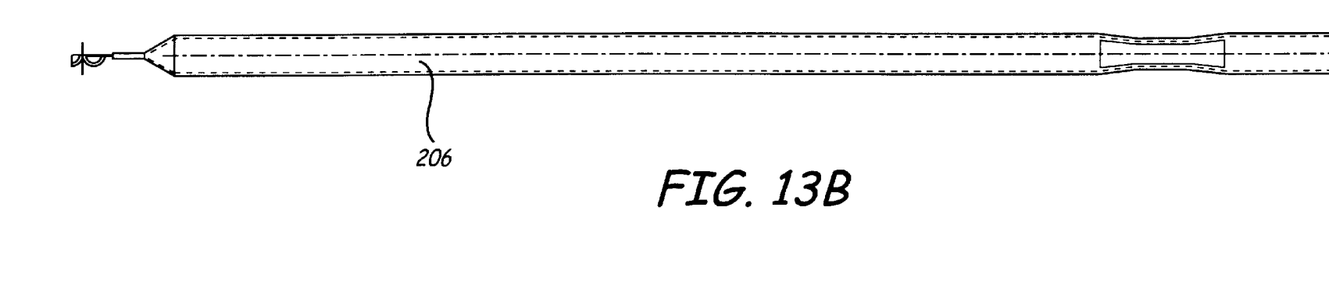
Figure 14A:
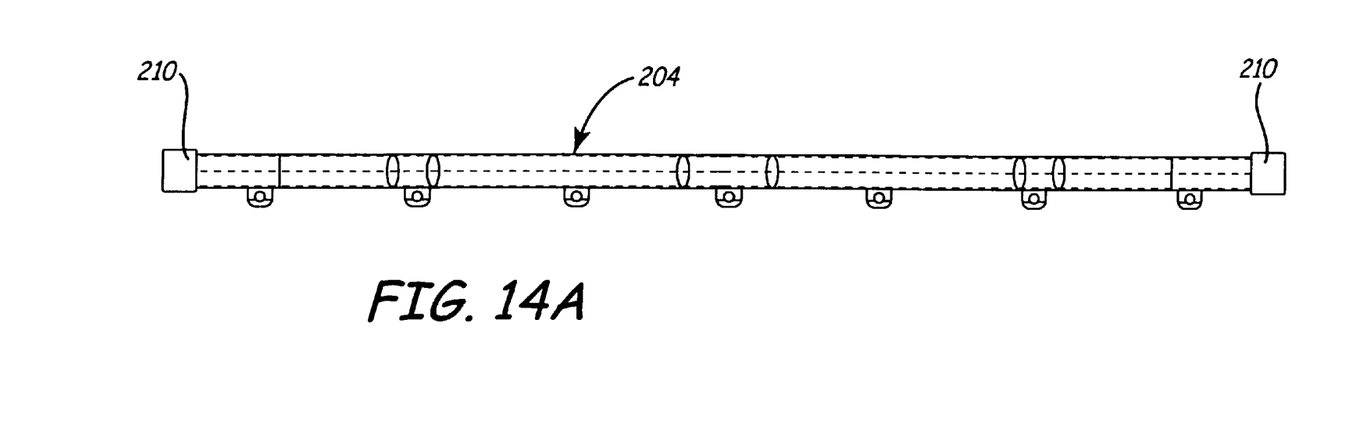
FIGS. 14A and 14B illustrate top and side views of a beam in accordance with one embodiment of the present invention.
Figure 14B:
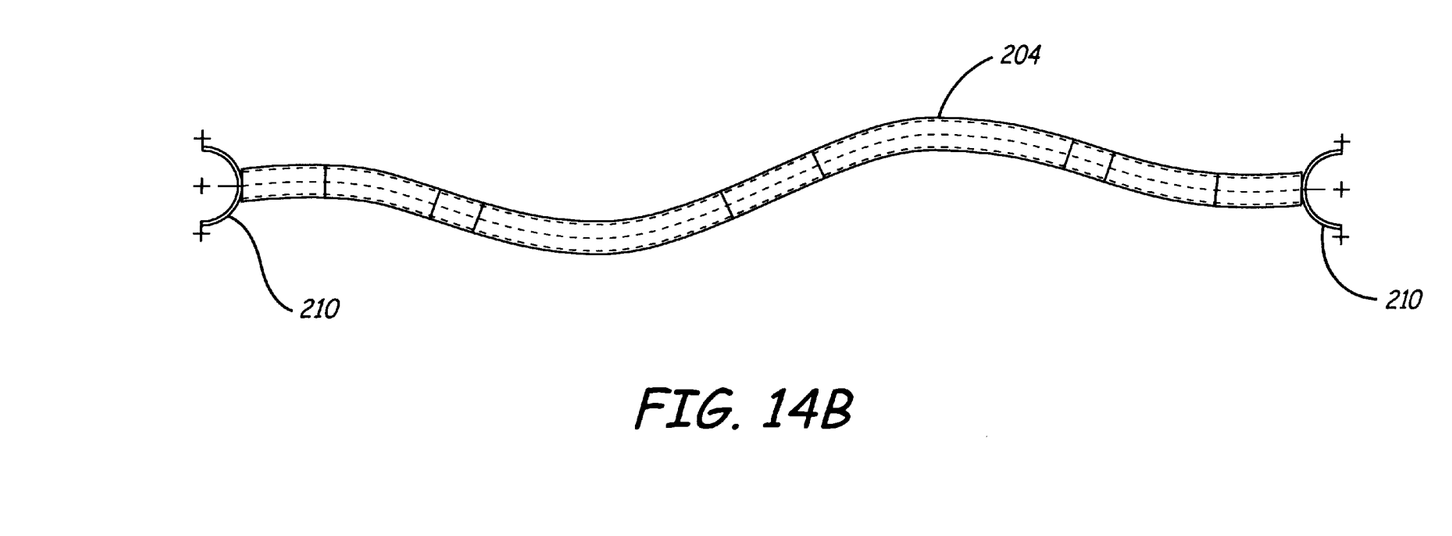

FIG. 12 illustrates another climbing structure 400. Climbing structure 400 includes assembly 304, which is the same as that illustrated in FIG. 11, except that one end of assembly 304 is connected to the ground while the other end is connected to a platform 402. Platform 402, in turn, is supported by a plurality of posts 404, which support platform 402 in a position raised from the ground FIGS. 13A–13B and FIGS. 14A–14B illustrate various views of footer 206 and beam 204. FIGS. 13A and 13B illustrate that the one-way clamp used to connect netting portion 202 to beam 204 FIG. 10 can also be used to connect netting portion 202 to the first end 214 of footers 206. The protruding edge 90 is simply welded to an abutting surface protruding from end 214 of footer 206.

Therefore, it can be seen that the present invention provides a modular-type structure which includes struts and connecting members which can be, configured in many different ways. Different overall physical confirmations can be developed and connected in such a way as to provide a suitable structure for climbing, or other structures, used, in one illustrative embodiment, for children entertainment apparatus.

Although the present invention has been described with reference to preferred embodiments, workers skilled in the art will recognize that changes may be made in form and detail without departing from the spirit and scope of the invention.

What is claimed is:

1. A modular entertainment-oriented climbing structure, comprising:

a first strut having an elongate portion, a first end portion and a transition portion between the elongate portion and the first end portion, the transition portion having a reduced thickness relative to the first end portion; and a connection member having first and second connectable plates defining a first cavity, the first cavity being sized to receive and fixedly secure the first end portion therein; and a covering disposed about the elongate portion of the first strut, the covering being formed of an elastomeric material that is soft relative to the elongate portion of the strut.

2. The climbing structure of claim 1 wherein the elongate member comprises a metal wire and wherein the covering comprises a polyvinyl chloride material.

3. The climbing apparatus of claim 1 wherein the covering includes a friction increasing outer surface.

4. The climbing structure of claim 1 wherein the first and second plates define a transition covering portion sized to receive, and frictionally engage the covering proximate the transition portion.

5. The climbing structure of claim 4 wherein the covering has a tapered exterior proximate the transition portion and wherein the transition covering portion has a tapered interior surface.

6. The climbing structure of claim 1 wherein the first and second plates are releasably connectable to one another.

7. The climbing structure of claim 1 wherein the end portion includes a ball connected to the elongate member at the transition section.

8. The climbing structure of claim 1, and further comprising:

a second strut having an elongate portion, a first end portion and a transition portion between the elongate portion and the first end portion, the transition portion having a reduced thickness relative to the first end portion.

9. The climbing structure of claim 8 wherein the first and second plates of the connection member further define a second cavity sized to receive and secure the first end portion of the second strut therein.

10. The climbing structure of claim 9 wherein the first and second plates of the connection member further define a third cavity sized to receive and secure a first end portion of a third strut therein.

11. The climbing structure of claim 10 wherein the first and second plates of the connection member further define a fourth cavity sized to receive and secure a first end portion of a fourth strut therein.

12. The climbing structure of claim 1 and further comprising:

a plurality of struts each having first and second ends and an elongate member therebetween; and a plurality of connection members each having a pair of plates defining a plurality of cavities, each cavity receiving a first or second end of one of the plurality of struts.

13. The climbing structure of claim 12 and further comprising:

at least one beam, at least one of the plurality of connection members being connected to the beam.

14. The climbing structure of claim 13 and further comprising:

at least one post coupled to at least one of the plurality of connection members.

15. A modular apparatus for use in forming a children's climbing structure, the apparatus comprising:

a connection member having first and second connectable plates defining a first cavity and a second cavity separated by a reduced thickness portion, the first cavity being sized to receive and fixedly secure a first end portion of an elongate strut therein and the second cavity being sized to receive an elongate portion of the strut therein, the second cavity also being sized to engage a covering disposed about an elongate portion of the elongate strut, the covering being formed of a substantially continuous material that enables the cover to bend without separating in response to an application of force.

16. The apparatus of claim 15 and further comprising:

an elongate strut having a cable connected to first and second enlarged ends and a covering that is soft relative to the cable said covering being disposed about the cable.

17. A climbing entertainment structure, comprising:

a plurality of struts each having first and second enlarged ends and an elongate member there between, the elongate member including a cable surrounded by a cover that is soft relative to the cable; and a plurality of connection members each having a pair of plates defining a plurality of cavities, each cavity receiving and fixedly securing a first or second enlarged end of one of the plurality of struts such that at least some of the plurality of struts form rungs in the climbing structure, said cover having a tapered exterior surface that is engaged by a corresponding tapered interior surface formed in and defined by the pair of plates proximate each of the plurality of cavities.

18. A climbing structure, comprising:

a first strut having an elongate portion, a covering disposed about the elongate portion, a first end portion and a transition portion between the elongate portion and the first end portion, the transition portion having a reduced thickness relative to the first end portion, wherein the covering is formed of a material which is soft relative to the elongate member; and a connection member having first and second connectable plates defining a first cavity, the first cavity being sized to receive and secure the first end portion therein, wherein the first and second connectable plates define a transition covering portion sized to receive and frictionally engage the covering proximate the transition portion, the covering having a tapered exterior proximate the transition portion, and wherein the transition covering portion has a tapered interior surface.

* * * * *

UNITED STATES PATENT AND TRADEMARK OFFICE
CERTIFICATE OF CORRECTION

PATENT NO. : 6,475,117 B1
DATED : November 5, 2002
INVENTOR(S) : David A. Berglund et al.

It is certified that error appears in the above-identified patent and that said Letters Patent is hereby corrected as shown below:

Title page,
Item [54], Title, "CONNECTION/STRUCTURE" and insert -- CONNECTION STRUCTURE --.

Column 7,
Line 24, after "cable" insert -- , --.

Signed and Sealed this

Twenty-eighth Day of September, 2004

JON W. DUDAS
*Director of the United States Patent and Trademark Office*